United States Patent
Belknap et al.

(10) Patent No.: US 9,934,633 B2
(45) Date of Patent: *Apr. 3, 2018

(54) TACTICAL SECURITY SYSTEM

(71) Applicant: Palantir Technologies Inc., Palo Alto, CA (US)

(72) Inventors: Geoff Belknap, Palo Alto, CA (US); Carl Cohen, Fremont, CA (US); Christopher Deringer, Menlo Park, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/362,423

(22) Filed: Nov. 28, 2016

(65) Prior Publication Data

US 2017/0169638 A1    Jun. 15, 2017

Related U.S. Application Data

(63) Continuation of application No. 14/149,387, filed on Jan. 7, 2014, now Pat. No. 9,508,203.
(Continued)

(51) Int. Cl.
*G07C 9/00* (2006.01)
*G08B 13/196* (2006.01)

(52) U.S. Cl.
CPC .... *G07C 9/00111* (2013.01); *G08B 13/19656* (2013.01)

(58) Field of Classification Search
CPC ................................. G07C 9/00007
See application file for complete search history.

(56) References Cited

U.S. PATENT DOCUMENTS 5,574,429 A * 11/1996 Streeter .............. G08B 13/1436
340/529
5,936,544 A    8/1999 Gonzales et al.
(Continued)

FOREIGN PATENT DOCUMENTS

EP          2866208       4/2015
WO    WO 2008/090262    7/2008
(Continued)

OTHER PUBLICATIONS

Glaab et al., "EnrichNet: Network-Based Gene Set Enrichment Analysis," Bioinformatics 28.18 (2012): pp. i451-i457.
Huang et al., "Systematic and Integrative Analysis of Large Gene Lists Using DAVID Bioinformatics Resources," Nature Protocols, 4.1, 2008, 44-57.
(Continued)

*Primary Examiner* — Joseph Feild
*Assistant Examiner* — Pameshanand Mahase
(74) *Attorney, Agent, or Firm* — Knobbe Martens Olson & Bear LLP

(57) ABSTRACT

A tactical security system can be used to secure a room. For example, such a security system may be contained in a housing sized for shipment to a location for placement in a room in order to secure the room. Various components may be included in the housing, such as a storage device configured to store data received from one or more audio or video recording devices; an access controller configured to interface with a badge reader associated with one or more access points to the room in order to selectively control access to the room; a switch configured to couple the one or more audio or video recording devices with the storage device and to couple the badge reader with the access controller; and/or a power supply configured to supply power to the devices in the housing.

20 Claims, 9 Drawing Sheets

Related U.S. Application Data

(60) Provisional application No. 61/895,243, filed on Oct. 24, 2013.

(56) References Cited

U.S. PATENT DOCUMENTS

| | | | |
|---|---|---|---|
| 6,259,352 | B1 | 7/2001 | Yulkowski et al. |
| 6,799,031 | B1 | 9/2004 | Lweiner et al. |
| 2004/0153418 | A1 | 8/2004 | Hanweck |
| 2004/0160309 | A1 | 8/2004 | Stilp |
| 2006/0109114 | A1* | 5/2006 | Watts ............ G08B 13/00 340/568.1 |
| 2007/0083921 | A1* | 4/2007 | Parris ............ A45C 5/14 726/9 |
| 2008/0169922 | A1* | 7/2008 | Issokson ...... G08B 13/19602 340/541 |
| 2008/0216156 | A1 | 9/2008 | Kosaka |
| 2008/0316024 | A1* | 12/2008 | Chantelou ...... G08B 25/10 340/539.17 |
| 2011/0069145 | A1 | 3/2011 | Weber et al. |
| 2012/0056722 | A1 | 3/2012 | Kawaguchi |

FOREIGN PATENT DOCUMENTS

| | | |
|---|---|---|
| WO | WO 2009/123975 | 10/2009 |
| WO | WO 2011/043732 | 4/2011 |

OTHER PUBLICATIONS

Hur et al., "SciMiner: web-based literature mining tool for target identification and functional enrichment analysis," Bioinformatics 25.6 (2009): pp. 838-840.

Zheng et al., "GOEAST: a web-based software toolkit for Gene Ontology enrichment analysis," Nucleic acids research 36.suppl 2 (2008): pp. W385-W363.

Official Communication for Australian Patent Application No. 2014253531 dated Jun. 4, 2015.

Official Communication for European Patent Application No. 14190197.5 dated May 23, 2016.

Official Communication for European Patent Application No. 14190197.5 dated Mar. 27, 2015.

Official Communication for U.S. Appl. No. 14/490,612 dated Aug. 18, 2015.

Official Communication for U.S. Appl. No. 14/490,612 dated Jan. 27, 2015.

Official Communication for U.S. Appl. No. 14/490,612 dated Mar. 31, 2015.

Notice of Allowance for U.S. Appl. No. 14/149,387 dated Jul. 25, 2016.

Official Communication for U.S. Appl. No. 14/149,387 dated Mar. 24, 2016.

Official Communication for European Patent Application No. 14190197.5 dated Oct. 2, 2017.

* cited by examiner

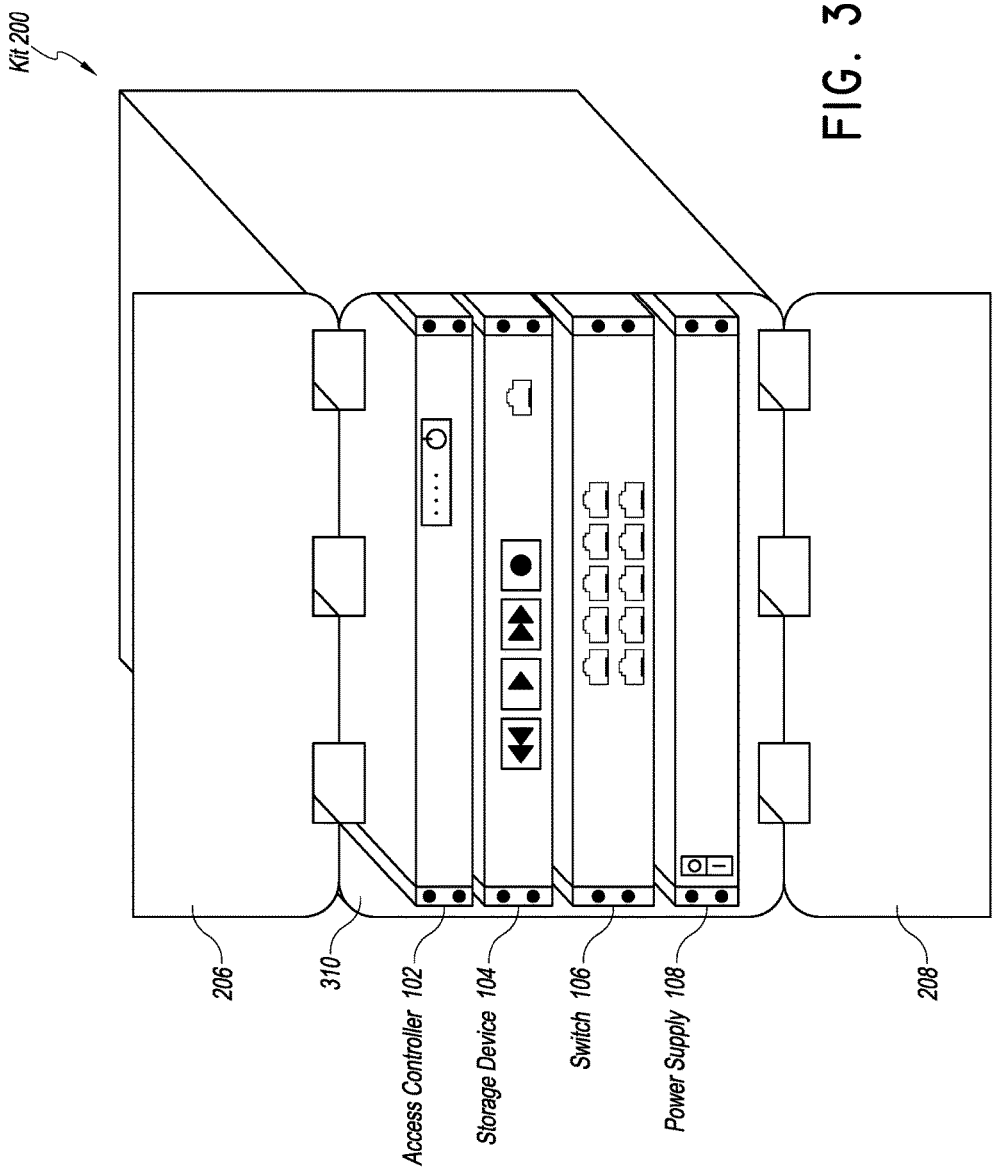

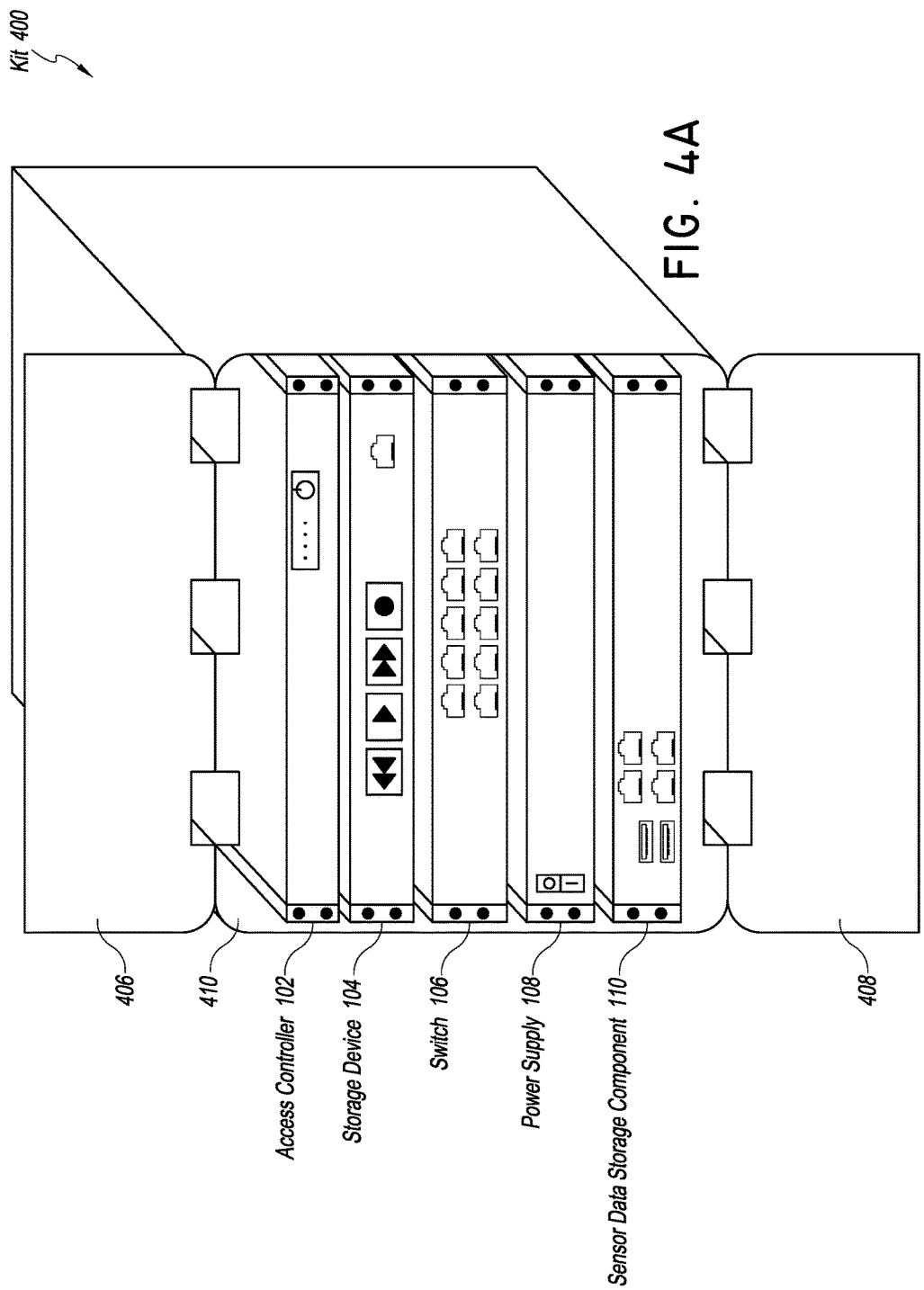

TACTICAL SECURITY SYSTEM

CROSS-REFERENCE TO RELATED APPLICATIONS

This application is a continuation of U.S. patent application Ser. No. 14/149,387, filed on Jan. 7, 2014 and titled "TACTICAL SECURITY SYSTEM," which claims a priority benefit under 35 U.S.C. § 119 to U.S. Provisional Patent Application No. 61/895,243, filed on Oct. 24, 2013 and titled "TACTICAL SECURITY SYSTEM," both of which are hereby incorporated by reference herein in their entireties.

TECHNICAL FIELD

The present disclosure relates to systems and techniques for building and deploying a tactical security system.

BACKGROUND

New buildings (e.g., new office space) can be constructed at the direction of individuals, companies, or developers. Construction of the new office space can take several months to several years. However, individuals, companies, or others who wish to rent or purchase the office space may provide payment before construction is completed in order to secure rights to the office space. Payment may be provided even in cases in which the new office space is not yet habitable. Thus, it may be important for individuals, companies, or others to be able to move in to the new office space as soon as construction is complete.

SUMMARY

Generally, individuals, companies, or others plan to keep important documents and/or equipment in the new office space. However, because of the sensitive nature of the documents and/or equipment, the documents and/or equipment cannot be moved into the new office space until the proper security equipment and related services have been installed. For example, if the new office space is being built to include a server room, door locks, card readers, network access, air conditioning, and/or the like may be needed before the server equipment can be installed. Currently, such security equipment and related services cannot be installed until construction is roughly ninety percent complete. If the new office space is being constructed at a geographic location separate from other office spaces owned or rented by the individuals, companies, or others, existing security equipment and related services cannot be leveraged. Thus, in some cases, it may be sixty days after construction is complete before the office space is secure enough to allow for the individuals, companies, or others to store their important documents and/or equipment on site.

One aspect of this disclosure provides a method for assembling a kit configured to secure a room, such as a server room of an office building into which a company plans to (and/or is in the process of) moving into. The method comprises providing a housing sized for shipment to a location for placement in a room in order to secure the room. The method further comprises placing a storage device in the housing. The storage device may be configured to store data received from one or more audio or video recording devices. The method further comprises placing an access controller in the housing. The access controller may be configured to interface with a badge reader associated with one or more access points to the room in order to selectively control access to the room. The method further comprises placing a switch in the housing. The switch may be configured to couple the one or more audio or video recording devices with the storage device and to couple the badge reader with the access controller. The method further comprises placing a power supply in the housing, the power supply coupled to the storage device, the access controller, and the switch. The power supply may be configured for coupling to the one or more audio or video recording devices and the badge reader in the room.

Another aspect of this disclosure provides a security kit for securing a room. The security kit comprises a storage device configured to store data received from one or more audio or video recording devices. The security kit further comprises an access controller configured to control access to a room in which the security kit is placed. The security kit further comprises a power supply configured to supply power to components of the security kit. The security kit further comprises a housing configured to at least partially enclose the storage device, the access controller, and the power supply. The security kit further comprises a front panel removably coupled to the housing, the front panel configured to at least partially enclose at least one of the storage device, the access controller, or the power supply when coupled to the housing. The security kit may be sized and weighted for shipment via a commonly available shipping courier.

Another aspect of this disclosure provides a security kit for securing a room. The security kit comprises a storage device configured to store data received from one or more audio or video recording devices. The security kit further comprises an access controller configured to interface with a badge reader associated with one or more access points to the room in order to selectively control access to the room. The security kit further comprises a switch coupled to the storage device and the access controller, the switch configured to connect the one or more audio or video recording devices with the storage device and to connect the badge reader with the access controller. The security kit further comprises a power supply configured to supply power to the storage device, the access controller, the switch, the one or more audio or video recording devices, and the badge reader. The security kit further comprises a housing configured to at least partially enclose the storage device, the access controller, and the power supply. The security kit further comprises a front panel removably coupled to the housing, the front panel configured to at least partially enclose at least one of the storage device, the access controller, or the power supply when coupled to the housing. The security kit may be configured for shipment.

BRIEF DESCRIPTION OF THE DRAWINGS

FIG. 3 illustrates a perspective view of a basic tactical security system.

FIG. 4A illustrates a perspective view of an enhanced tactical security system.

DETAILED DESCRIPTION

Overview

Figure 1:
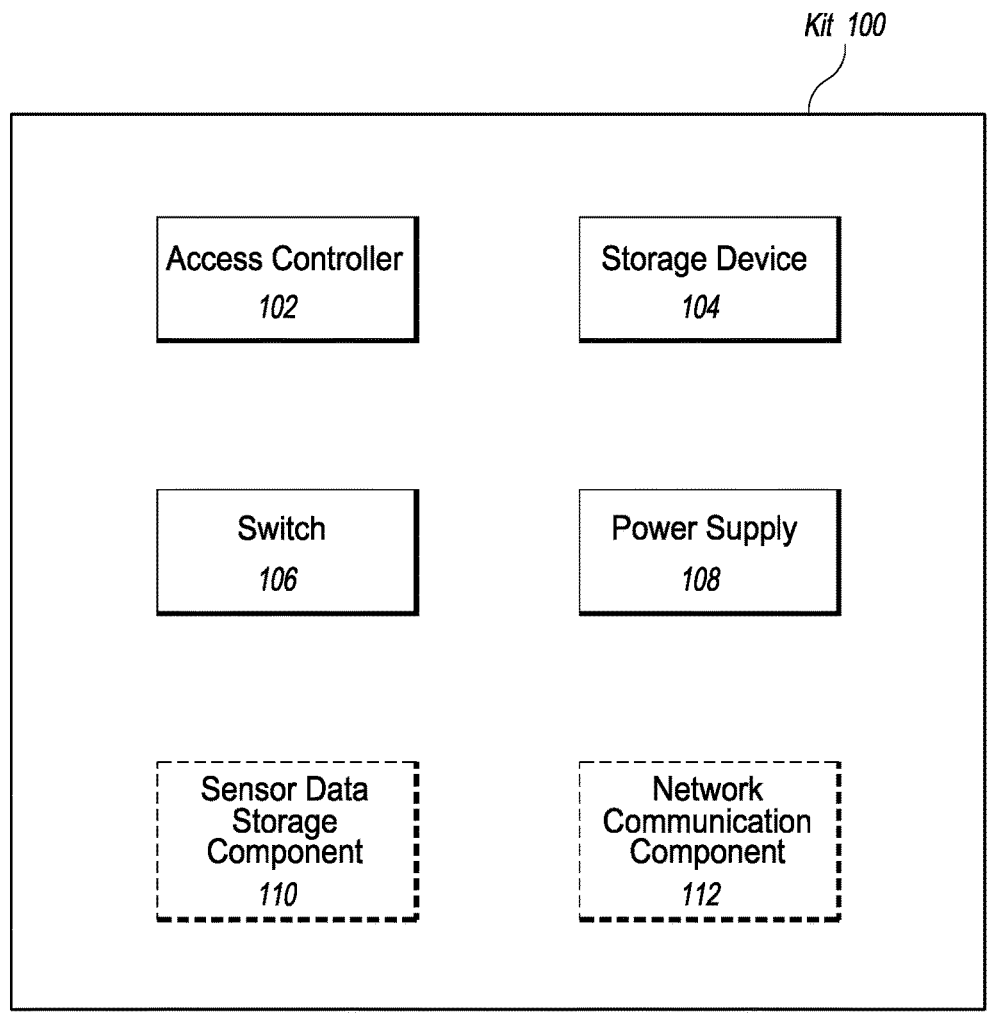
FIG. 1 illustrates a block diagram of a tactical security system.

Disclosed herein are various systems and methods that allow individuals, companies, or others to secure a room. In particular, the systems and methods disclosed herein can allow individuals, companies, or others to secure a room before construction is complete. As described above, because individuals, companies, or others may begin paying for office space before construction is complete (or at the very latest when construction is complete), moving into the new office space as soon as construction is complete may be important from a cost perspective.

However, if important documents and/or equipment are to be stored in the office space, security equipment and related services should be installed beforehand. Construction sites often experience theft (e.g., theft of tools, construction materials, etc.), so it would be unwise to store such important documents and/or equipment in an unsecure building. The drawback of waiting for the building to be secure before storing such important documents and/or equipment is that it can take time to secure the building or even a room in the building. For example, those responsible for installing the appropriate security equipment and related services may need to contact a service provider in order to secure network access, may need to install door locks or card readers, may need to install air conditioning units, and/or the like. Often, those responsible for installing the appropriate security equipment and related services must wait until the building is nearly complete (e.g., ninety percent complete) because locking doors, a stable power source, sprinklers that meet fire codes, and/or other components of a building may need to be in place first. Thus, in some circumstances, it can be sixty days or more after construction is completed before the security equipment and related services are functional.

In order to save costs, individuals, companies, or others may occupy the office space before the building is fully secured. However, this may further delay the installation of the security equipment and related services because the IT professionals in charge of installing the security equipment and related services may not have undisturbed access to the building, for example. Rather, the IT professionals may have to work around those occupying the building and deal with any complaints that arise.

Accordingly, a tactical security system is described herein that alleviates at least some of the problems described above. The tactical security system can be a portable, shippable box or container that can be used to secure a room in a building. For example, the tactical security system can be a self-contained system that provides a power supply, an access controller, a storage device (e.g., a digital video recorder, a hard drive, flash memory, etc.), and/or a switch to couple each of the components together. The power supply could be used to provide power to external devices (e.g., a camera, a card reader, a light bulb, etc.), the access controller could be configured to determine who is allowed and who is not allowed to access a room, and the storage device could be configured to record who enters and/or exits the room. In this way, the tactical security system acts as a plug-n-play system that can secure a room once one or more external devices are wired or coupled to the components of the system.

The tactical security system has several benefits. For example, the builders could be instructed to complete at least one room in the building first before continuing construction on the rest of the building. The tactical security system could then be used to secure the completed room. In some embodiments, the tactical security system could provide a stable power supply to various devices that could be used to secure the room (e.g., cameras, card readers, locks, etc.). In addition, the stable power supply could be used to run other devices, such as air conditioners. A network service provider, for example, could then be contacted months before construction is complete to enable network access because the building includes a secure room and a stable power supply (which may be required by some network service providers before enabling network access to the site). With a secure room, important documents and/or equipment could also be stored in the room well before occupants move in. Thus, the sixty days lost where construction is complete, but occupants cannot move in, can be recaptured using the tactical security system.

As another example, the tactical security system can be used to perform testing and commissioning. The tactical security system could check to make sure resistors are in place, lines are not crossed, that the lights work, and/or check other electrical or mechanical issues that crop up when a building is first constructed. In this way, such issues could be validated before occupants move in and before the building is fully constructed. Thus, less testing and/or repair may be required when the permanent security system is installed in the building, thereby reducing the inconvenience to occupants and minimizing costs.

As another example, the tactical security system can provide independent network access. As described above, the equipment to be stored in the room may require network access. Instead of waiting for a network service provider to enable network access in the room or building, the tactical security system could provide network access via a universal serial bus (USB) device or such similar device. Thus, securing the room can be further accelerated.

As another example, the tactical security system can power and/or secure a portion of or an entire office space, not just a single room. The same systems and techniques described herein to power and secure a room can also apply to multiple rooms.

As another example, the tactical security system can be reused. Once a permanent security system is put in place, the various external devices can be disconnected from the components of the tactical security system. The tactical security system can then be packed up (e.g., by closing the panels as described below) and shipped to another location.

Tactical Security System Overview

FIG. 1 illustrates a block diagram of a tactical security system or kit 100. As illustrated in FIG. 1, the kit 100 includes access controller 102, storage device 104, switch 106, and/or power supply 108. In some embodiments, the kit 100 further includes sensor data storage component 110 and/or network communication component 112.

In an embodiment, access controller 102 is configured to control access to a room in which the kit 100 is placed. The access controller 102 can control access to the room via locks, card readers, and/or the like. For example, one or more card readers (e.g., radio frequency identification (RFID) readers, smart card readers, badge readers, memory card readers, barcode scanners, biometric data readers, magnetic stripes, proximity cards, etc.) mounted near or on a door that provides access to the room can couple to the access controller 102 via one or more physical interfaces (e.g., serial ports, parallel ports, USB ports, Ethernet ports, IEEE 1394 ports, high-definition multimedia interface (HDMI) ports, etc.) of the access controller 102 and the switch 106. The one or more card readers can collect data when a user attempts to access the room using an access card and transmit such data to the access controller 102. The access controller 102 can include one or more processors or other such components to analyze data received from the one or more card readers, determine whether access should be allowed or denied, and transmit such results to the one or more card readers. The one or more card readers can then allow or deny access, such as by transmitting an unlock or lock signal to an electronic lock, based on the instructions received from the access controller 102.

In some embodiments, the access controller 102 is pre-configured to allow access to certain users and deny access to other users. In other embodiments, at least some access rights are provided to the access controller 102 after installation of the kit 100, such as in response to updated permissions received via the network. As an example, the updated permissions can be received from a company that is moving into the building. As another example, the access controller 102 can receive updated permissions from other components of kit 100. As described below, other components of kit 100, such as the storage device 104, can include memory. Permissions can be stored in memory and provided to the access controller 102 before delivery of the kit 100 and/or after the kit 100 is installed.

The storage device 104 can be configured to store data received from one or more audio or video recording devices. The audio or video recording devices could be microphones, still cameras, video cameras, and/or the like. For example, one or more video or still image cameras (e.g., analog or digital video and/or still cameras) located inside or outside the room can couple to the storage device 104 via one or more physical interfaces (e.g., serial ports, parallel ports, USB ports, Ethernet ports, IEEE 1394 ports, HDMI ports, etc.) of the storage device 104 and the switch 106. Any data captured by the one or more video or still image cameras can be transmitted to the storage device 104 for temporary or permanent storage. As an example, the captured data may be stored for a set period of time (e.g., 24 hours) before being deleted. As another example, the captured data may be stored until the storage device has reached storage capacity. The captured data can be stored on a hard drive, on flash memory, and/or the like.

In some embodiments, the storage device 104 includes network access. Thus, the storage device 104 can be controlled remotely and/or captured data can be transmitted over the network to another device (e.g., a server at a remote location).

The switch 106 can be coupled to the access controller 102 and/or the storage device 104 via the physical interfaces of the access controller 102 and/or the storage device 104. The switch 106 can be a physical device and/or a cable. In an embodiment, the switch 106 is configured to connect locks, card readers, and/or other devices with the access controller 102 and to connect the audio or video recording devices with the storage device 104. For example, the switch can receive data from the locks or card readers via an electrical current-carrying conductor (e.g., a wire, a cable, etc.). The switch can then forward the data to the physical interfaces of the access controller 102 via an electrical current-carrying conductor. Likewise, the switch can receive data from the audio or video recording devices via an electrical current-carrying conductor. The switch can then forward the data to the physical interfaces of the storage device 104 via an electrical current-carrying conductor.

In an embodiment, the power supply 108 is configured to supply power to the access controller 102, the storage device 104, and/or the switch 106. In further embodiments, the power supply 108 is configured to supply power to the devices connected to the access controller 102, the storage device 104, and/or the switch 106 (e.g., locks, card readers, audio or video recording devices, etc.). The power supply 108 can supply a continuous amount of power (e.g., serve as a generator, receive power from an outlet in the wall of the building, etc.) and/or serve as a battery back-up in situations in which another power source (e.g., in the building or room) is not available. In some embodiments, in addition to the power supply 108, a battery back-up that provides four to twenty four hours (or other quantity) of power may be available in the kit 100.

The sensor data storage component 110 can be coupled to the switch 106 and/or the power supply 108 and be configured to receive data from one or more sensors located inside or outside the room. For example, one or more sensors can be coupled to the switch 106 and transmit data to the sensor data storage component 110 via the switch 106. The sensors may include devices that can detect at least one of heat, smoke, water, noise, and/or the like.

In some embodiments, the sensor data storage component 110 is further configured to provide data to the access controller 102. The access controller 102 can use such data to determine whether to allow or deny access to the room. For example, a sensor may be a smoke detector located outside the room. If the smoke detector detects smoke, such information may be passed to the access controller 102 via the sensor data storage component 110. The access controller 102 may then deny access to the room in order to protect the contents of the room. As another example, a sensor may be a microphone located inside the room. If the microphone detects noise (e.g., from a drill being used to drill through a wall of the room), such information may be passed to the access controller 102 via the sensor data storage component 110 and the access controller 102 may deny access to the room.

The network communication component 112 can be configured to transmit data to a location remote from the room over a network and/or receive data from a location remote from the room over the network. For example, the network communication component 112 can include a wired or wireless network card, a USB device, and/or the like that connects to a wired network, a landline phone network, a Wi-Fi network, a cellular network, a WiMax network, and/or the like. The network communication component 112 can be coupled to the access controller 102, the storage device 104, the switch 106, the power supply 108, and/or the sensor data storage component 110. Data can be retrieved or received from any of the devices of kit 100 and transmitted over the network. Likewise, data can be received over the network and forwarded to any of the devices of kit 100.

Figure 2:
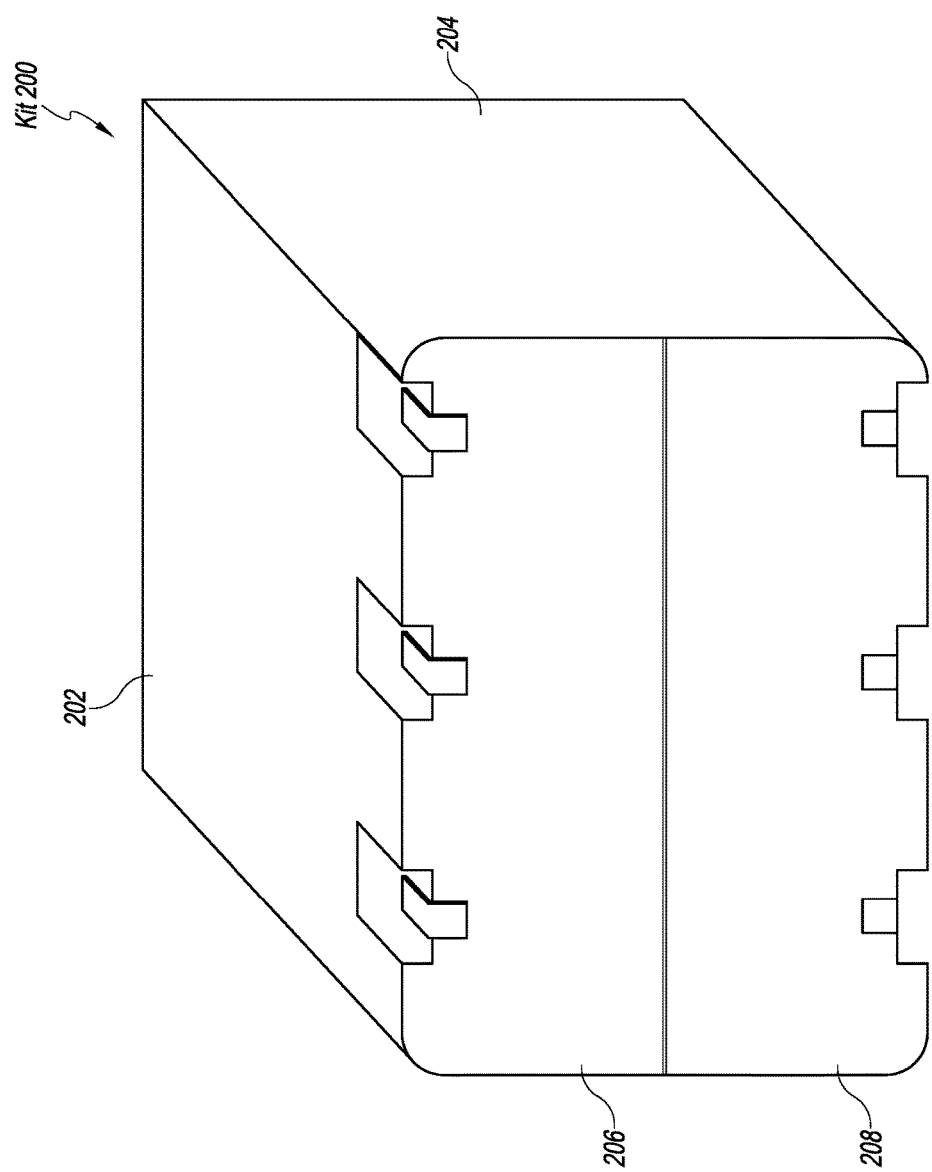
FIG. 2 illustrates a perspective view of a tactical security system.

FIG. 2 illustrates a perspective view of a tactical security system or kit 200. In the example embodiment of FIG. 2, a housing of the kit 200 includes panels 202, 204, 206, and/or 208. Each panel 202, 204, 206, and/or 208 can be constructed of a material that is durable and that can protect the contents of the kit 200 when being shipped via air, land, or sea. Some or all of the panels 202, 204, 206, and/or 208 can be removably coupled to the internal components of the kit 200 and/or the other panels 202, 204, 206, and/or 208.

In an embodiment, panels 206 and/or 208 are flaps that can be opened when the kit 200 is unlocked and ready to be used. While FIG. 2 illustrates two panels 206 and 208 that together open to reveal the contents of the kit 200, this is not meant to be limiting. The kit 200 may include any number of panels that can open to reveal the contents of the kit 200. For example, the kit 200 can include panels that open to reveal the front, side, and/or rear of the components of the kit 200.

FIG. 3 illustrates a perspective view of the basic tactical security system or kit 200 of FIG. 2, with the panels 206 and 208 open to reveal the components of the kit 200. In this example embodiment, the kit 200 includes the access controller 102, the storage device 104, the switch 106, and the power supply 108. As described above, the access controller 102, the storage device 104, the switch 106, and/or the power supply 108 can be coupled to each other via electrical current-carrying conductors or wireless connections (not shown). While the access controller 102, the storage device 104, the switch 106, and the power supply 108 are depicted in a certain order, this is not meant to be limiting as the access controller 102; rather, the storage device 104, the switch 106, and the power supply 108 can be positioned in any order and configuration within the housing of the kit 200. Each of the components may be mounted to an interior 310 of the kit 200. For example, one or more of the components can be screwed, snapped, latched, velcroed, etc., into the interior 310. In this way, the access controller 102, the storage device 104, the switch 106, and/or the power supply 108 may be securely attached to the kit 200 when the kit 200 is shipped.

FIG. 4A illustrates a perspective view of an enhanced tactical security system or kit 400. As illustrated in FIG. 4A, panels 406 and 408 are open to reveal the components of the kit 400. The kit 400 includes similar components to those in kit 200 (FIGS. 2 and 3), but also includes the sensor data storage component 110, which may include one or more sensors and/or be configured to couple to one or more sensors, as discussed above.

The access controller 102, the storage device 104, the switch 106, the power supply 108, and/or the data storage component 110 can be coupled to each other via electrical current-carrying conductors or wireless connections (not shown), and may be positioned in any other orientation or order within the housing. Each of the components may be mounted to an interior 410 of the kit 400 such that the kit 400 is suitable for shipping via a commonly available shipping carrier with minimal risk of component damage due to movement of the components within the housing. For example, the kit 400 (and other kits discussed herein) may be sized and weighted so that it can be shipped via UPS, FEDEX, USPS, DHL, or other commonly available shipping services. Advantageously, the components that are included in the kit may be coupled to one another prior to shipping, such that the security system is essentially a plug and play security device at the use (e.g., customer) location.

Figure 4B:
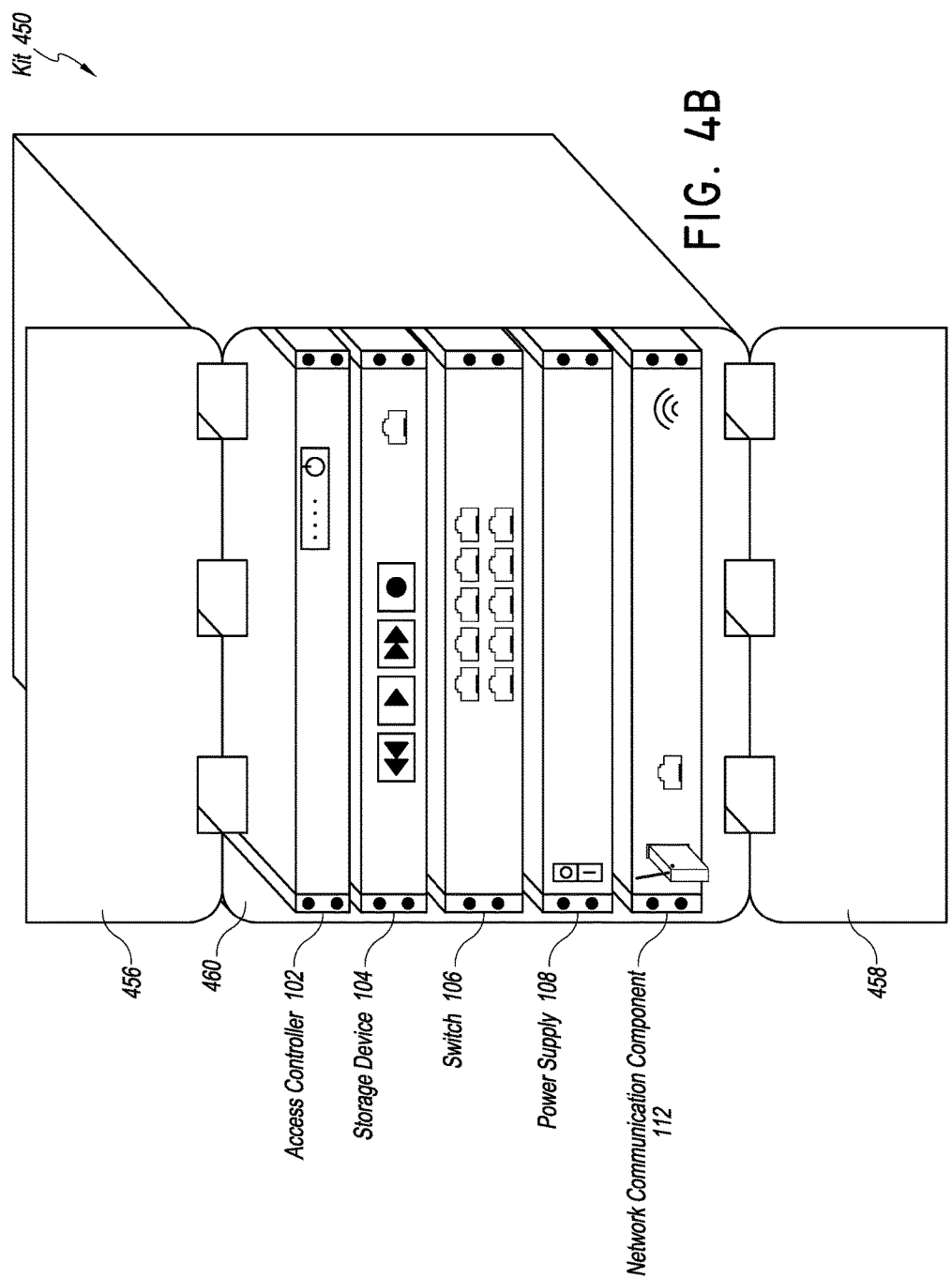
FIG. 4B illustrates a perspective view of another enhanced tactical security system.

FIG. 4B illustrates a perspective view of another enhanced tactical security system or kit 450. As illustrated in FIG. 4B, panels 456 and 458 are open to reveal the components of the kit 450. The kit 450 includes similar components to those in kit 200 (FIGS. 2 and 3), but also includes the network communication component 112, which may be configured to transmit data to a location remote from the room over a network and/or receive data from a location remote from the room over the network, as described above.

The access controller 102, the storage device 104, the switch 106, the power supply 108, and/or the network communication component 112 can be coupled to each other via electrical current-carrying conductors or wireless connections (not shown), and may be positioned in any orientation or order within the housing. Similar to the kit 400 of FIG. 4, each of the components may be mounted to an interior 460 of the kit 450 such that the kit 450 is suitable for shipping via a commonly available shipping carrier with minimal risk of component damage due to movement of the components within the housing.

Example Use Cases

Figure 5A:
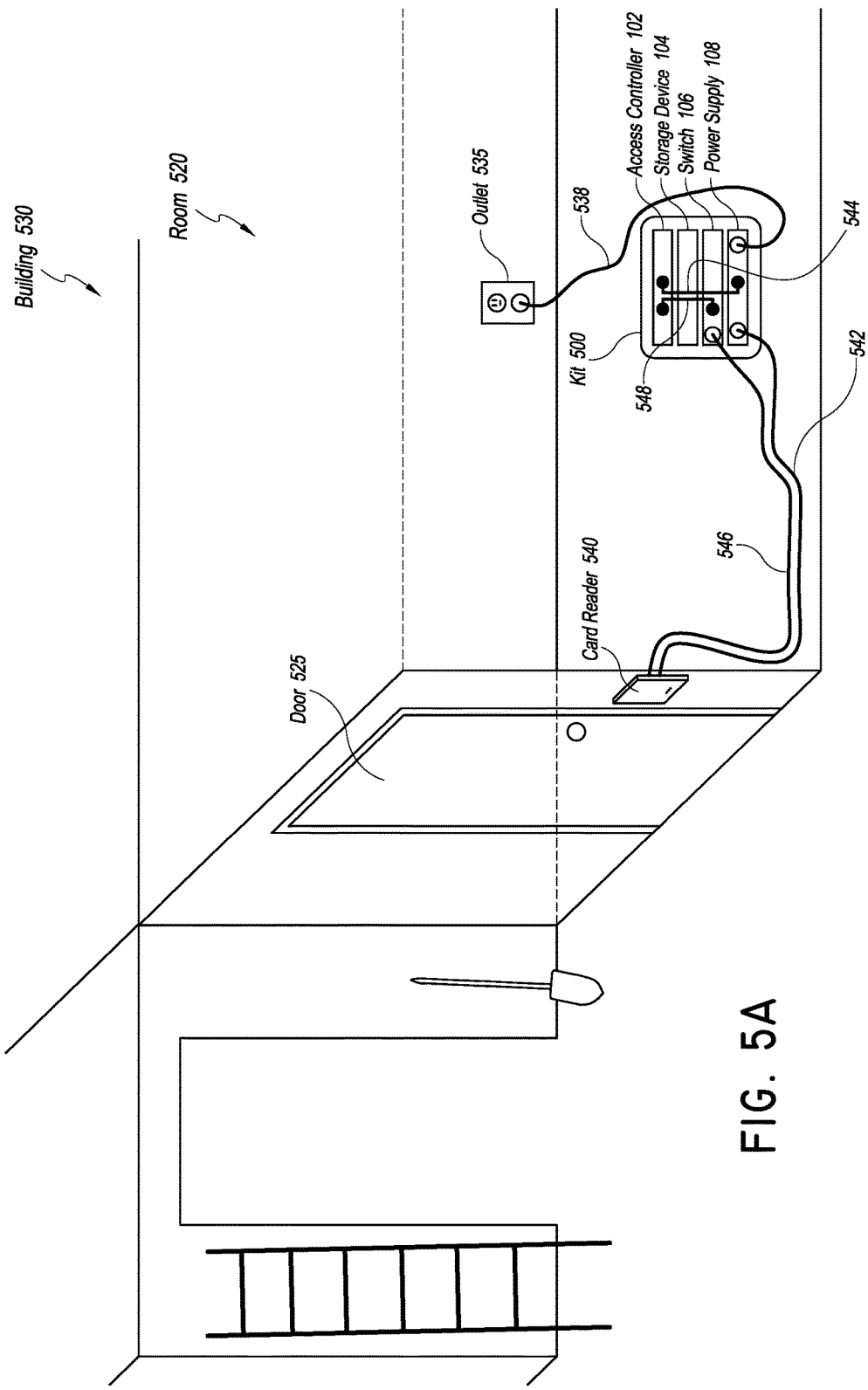
FIGS. 5A-5B illustrate exemplary use cases for a basic tactical security system.
Figure 5B:
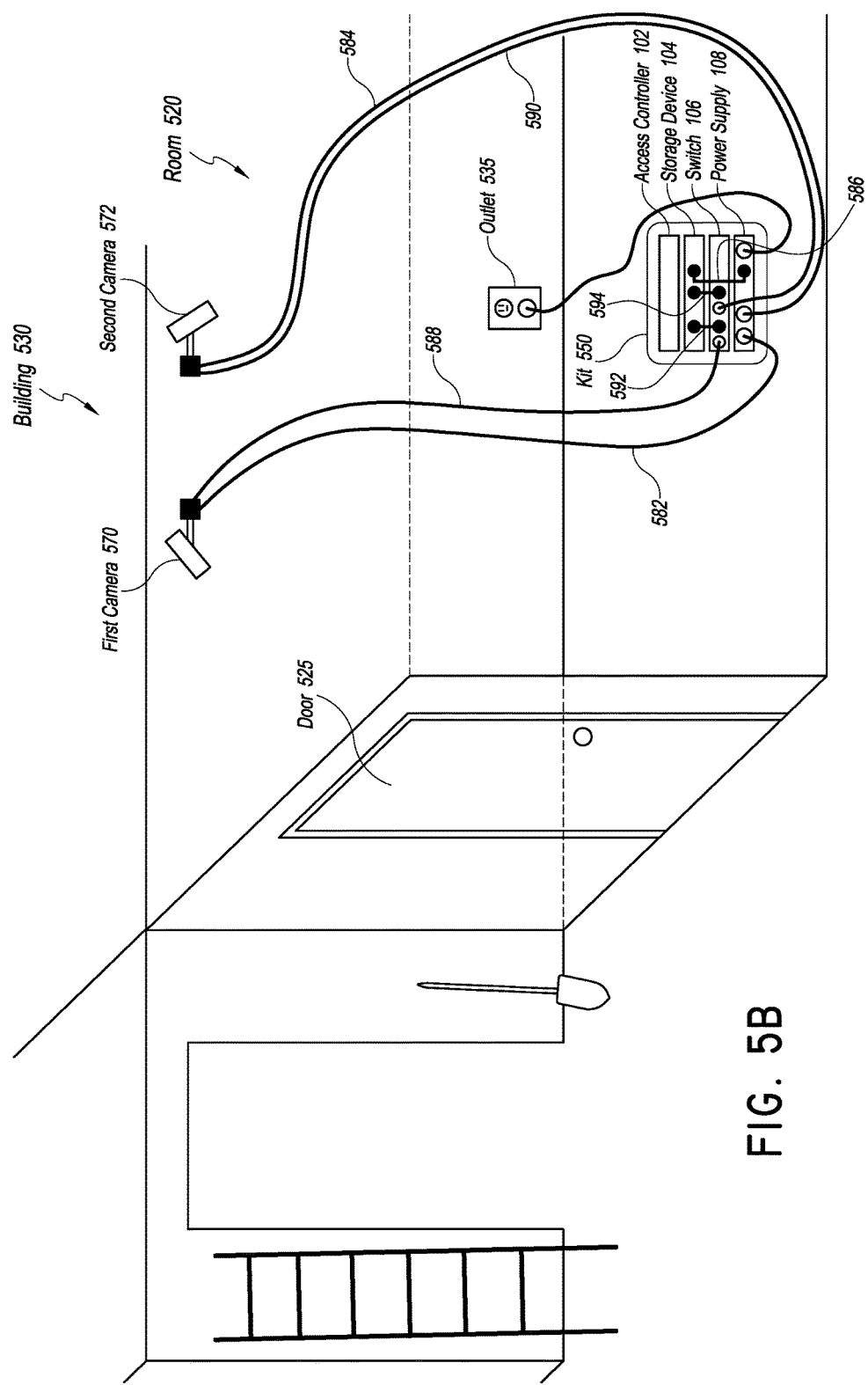

FIGS. 5A-5B illustrate exemplary use cases for a basic tactical security system. As illustrated in FIG. 5A, a kit 500 is located in a fully constructed room 520 secured by a door 525. However, the room 520 is located in a building 530 in which construction is not finished and in which security of valuable information is important.

In the embodiment of FIGS. 5A-5B, the kit 500 includes access controller 102, storage device 104, switch 106, and power supply 108. While not shown, the kit 500 can include any other components described herein. Power supply 108 receives power from outlet 535 via cable 538. In an embodiment, power supply 108 is configured to supply power to a card reader 540 via cable 542 and the access controller 102 via cable 544.

The card reader 540 can be configured to control the locking mechanism of the door 525. For example, the card reader 540 can lock or unlock the door 525 based on whether a user has permission to enter the room 520, such as based on credentials embedded in an access card of the user that are compared to access rules stored at the access controller 102.

In an embodiment, the switch 106 is configured to receive and/or transmit data to the card reader 540 via cable 546. In further embodiments, the switch 106 may be configured to forward data received from the card reader 540 to the access controller 102 via cable 548. Likewise, the switch 106 may be configured to transmit data received from the access controller 102 to the card reader 540 via cable 548.

As an example, a user can attempt to access the room 520 by requesting access via the card reader 540 (e.g., by swiping a card in front of the card reader 540, by providing biometric data to the card reader 540, etc.). The request to receive access to the room 520 can be transmitted by the card reader 540 to the switch 106. The switch 106 can then forward this request to the access controller 102, which then determines whether to allow or deny access (e.g., by determining an identity of the user and determining whether the identified user has been granted permission to access the room 520 by a third party). The determination of whether to allow or deny access can then be transmitted as an instruction by the access controller 102 to the switch 106. The switch 106 can then forward the instruction to the card reader 540, where the card reader 540 performs the appropriate action based on the instruction. When a permanent security system is ready for use, cables 538, 542, 544, 546, and/or 548 can be disconnected from the kit 500 and the kit 500 can be packed for use at another location.

As illustrated in FIG. 5B, a kit 550 is located in the fully constructed room 520 secured by the door 525. However, construction has not been completed in building 530, in which room 520 is located.

The kit 550 includes components similar to those in kit 500 (e.g., access controller 102, storage device 104, switch 106, and power supply 108), but in this embodiment has two cameras coupled to the kit 550. In this embodiment, power supply 108 is configured to supply power to a first camera 570 via cable 582, a second camera 572 via cable 584, and the storage device 104 via cable 586. Although not shown in FIG. 5B, the access controller 102 may be coupled to other components as illustrated in FIG. 5A.

The first camera 570 and the second camera 572 are mounted inside the room 520. The first camera 570 and/or the second camera 572 can be configured to capture still images and/or video within the room 520. In some embodiments, the first camera 570 and/or the second camera 572 can swivel (e.g., automatically or at the control of a third party) in order to capture still images and/or video of various parts of the inside of the room 520.

In an embodiment, the switch 106 is configured to receive and/or transmit data to the first camera 570 via cable 588 and is configured to receive and/or transmit data to the second camera 572 via cable 590. In further embodiments, the switch 106 is configured to forward data received from the first camera 570 to the storage device 104 via cable 592 and is configured to forward data received from the second camera 572 to the storage device 104 via cable 594. Likewise, the switch 106 is configured to transmit data received from the storage device 104 to the first camera 570 via cable 592 and/or to the second camera 572 via cable 594.

As an example, the first camera 570 and/or the second camera 572 can be used to record and track users that enter the room 520. The captured data can be stored by the storage device 104. In some embodiments, the captured data can be stored for a temporary amount of time. In other embodiments, the captured data can be transmitted to a remote server (e.g., via network access) for more permanent storage. Any other sensors, such as microphones, heat, humidity, etc., may be coupled to the kit 550 in a similar manner. In some embodiments, one or more of the sensors discussed herein may be included in the kit 550, such as a temperature and humidity sensor that is attached to the kit 550 housing and coupled to the power supply 108 and access controller 102 upon shipment.

When a permanent security system is ready for use, cables 578, 582, 584, 586, 588, 590, 592, and/or 594 can be disconnected from the kit 550 and the kit 550 can be packed for use at another location.

Figure 6:
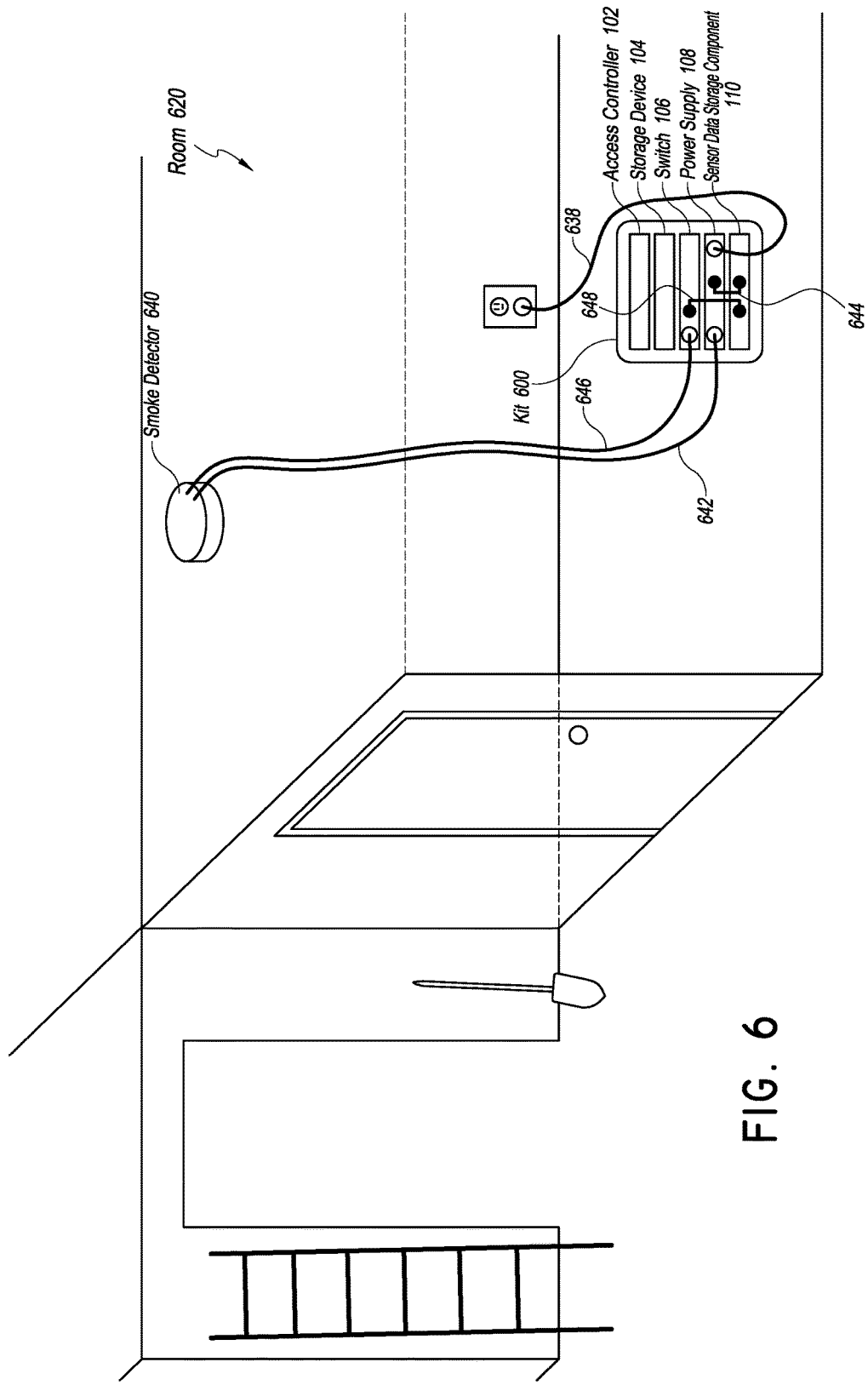
FIG. 6 illustrates an exemplary use case for an enhanced tactical security system.

FIG. 6 illustrates an exemplary use case for an enhanced tactical security system. As illustrated in FIG. 6, a kit 600 includes some components similar to those in earlier figures, including access controller 102, storage device 104, switch 106, power supply 108, and sensor data storage component 110. In this embodiment, the power supply 108 is additionally configured to supply power to a smoke detector 640 via cable 642 and the sensor data storage component 110 via cable 644.

The smoke detector 640 can be mounted to the ceiling or wall of the room 620 and be configured to detect whether smoke is present in the room 620. For example, the smoke detector 640 can transmit a signal and/or sound an alarm if the amount of smoke detected exceeds a threshold value.

In an embodiment, the switch 106 is configured to receive and/or transmit data to the smoke detector 640 via cable 646. In further embodiments, the switch 106 is configured to forward data received from the smoke detector 640 to the sensor data storage component 110 via cable 648. Likewise, the switch 106 is configured to transmit data received from the sensor data storage component 110 to the smoke detector 640 via cable 648.

As an example, the smoke detector 640 can transmit a signal to the sensor data storage component 110 via the switch 106 when a threshold level of smoke is detected in the room 620. The sensor data storage component 110 can alert the access controller 102 via a cable connection directly or through the switch 106 (not shown) that smoke above a threshold level is detected. The access controller 102 can then instruct a card reader (not shown) to allow access to all users or certain users (e.g., firefighters) when access to the room 620 is requested such that the smoke can be removed. When a permanent security system is ready for use, cables 638, 642, 644, 646, and/or 648 can be disconnected from the kit 600 and the kit 600 can be packed for use at another location.

Example Process Flows

Figure 7:
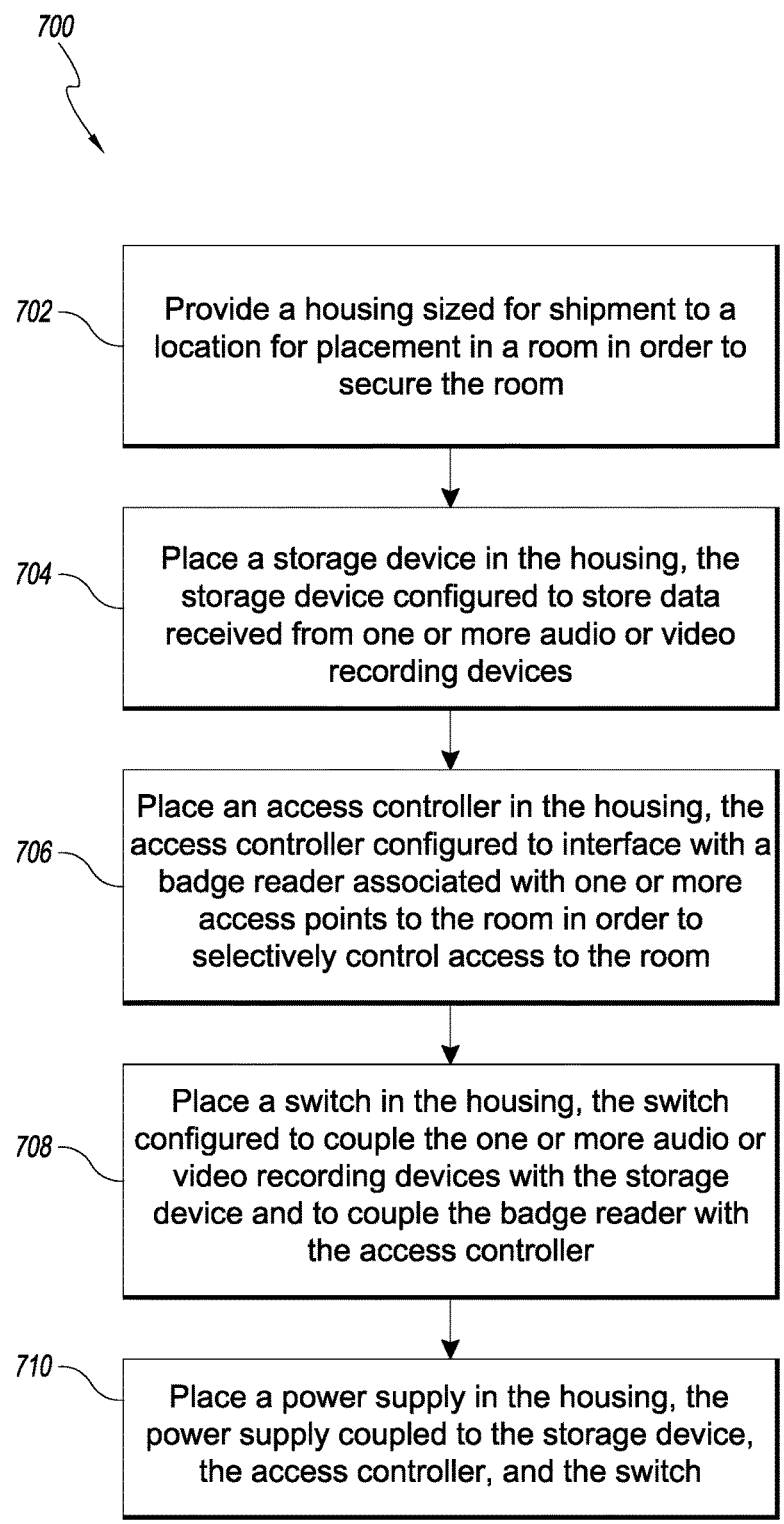
FIG. 7 is a flowchart depicting an illustrative method for assembling a kit configured to secure a room.

FIG. 7 is a flowchart 700 depicting an illustrative method for assembling a kit 100 configured to secure a room. Depending on the embodiment, the method of FIG. 7 may be performed by various computing or mechanical devices, such as robots or humans working an assembly line. Depending on the embodiment, the method of FIG. 7 may include fewer and/or additional blocks and the blocks may be performed in an order different than illustrated.

In block 702, a housing sized for shipment to a location for placement in a room in order to secure the room is provided. For example, the housing can be constructed of a material that can protect the contents of the housing during the shipping process.

In block 704, a storage device is placed in the housing. In an embodiment, the storage device is configured to store data received from one or more audio or video recording devices. In a further embodiment, the audio or video recording devices include cameras configured to capture still images and/or video.

In block 706, an access controller is placed in the housing. In an embodiment, the access controller is configured to interface with a badge reader associated with one or more access points to the room in order to selectively control access to the room. In a further embodiment, the one or more access points to the room includes one or more doors and/or windows.

In block 708, a switch is placed in the housing. In an embodiment, the switch is configured to couple the one or more audio or video recording devices with the storage device and to couple the badge reader with the access controller. In a further embodiment, the switch acts as a wireless relay, coupling the one or more audio or video recording devices with the storage device using a wireless connection. In a further embodiment, the switch acts as a wireless relay, coupling the badge reader with the access control using a wireless connection.

In block 710, a power supply is placed in the housing. In an embodiment, the power supply is coupled to the storage device, the access controller, and the switch. In a further embodiment, the power supply is configured to supply power to the storage device, the access controller, and the switch. In a further embodiment, the power supply is configured to supply power to the audio or video recording devices and/or the badge reader. In a further embodiment, the power supply receives power from an outlet installed in the room.

TERMINOLOGY

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A plug and play security kit for securing a room, the security kit comprising:
   an access controller configured to control access to a room in which the security kit is placed;
   a power supply coupled to the access controller, the power supply configured to supply power to components of the security kit;
   a housing configured to at least partially enclose the access controller and the power supply; and
   an access panel coupled to the housing, the access panel configured to at least partially enclose at least one of the access controller or the power supply when coupled to the housing,
   wherein the access controller and the power supply are enclosed within the housing of the security kit such that coupling one or more external devices to the security kit initiates access control to the room by the security kit.

2. The plug and play security kit of claim 1, wherein the access control component is further configured to interface with a badge reader associated with one or more access points to the room in order to selectively control access to the room.

3. The plug and play security kit of claim 2, further comprising a switch configured to couple one or more audio or video recording devices with a storage device enclosed within the housing and to couple the badge reader with the access control component.

4. The plug and play security kit of claim 3, wherein the power supply is coupled to the storage device, the access control component, the switch, the one or more audio or video recording devices, and the badge reader.

5. The plug and play security kit of claim 1, further comprising a sensor data storage component configured to receive data from one or more sensors, wherein the one or more sensors detect at least one of heat, smoke, water, or noise.

6. The plug and play security kit of claim 5, wherein the access controller is further configured to control access to the room based on the data received from the one or more sensors.

7. The plug and play security kit of claim 1, further comprising a network communication component configured to transmit data to a location remote from the room over a network.

8. The plug and play security kit of claim 7, wherein the network communication component is further configured to transmit data stored in a storage device to a server over the network.

9. The plug and play security kit of claim 1, wherein the access controller is further configured to:
   unlock the room in response to a first user requesting access to the room; and
   lock the room in response to a second user requesting access to the room.

10. A security kit for securing a room, the security kit comprising:
    an access controller configured to interface with a badge reader associated with one or more access points to the room in order to selectively control access to the room;
    a switch coupled to the access controller, the switch configured to connect one or more audio or video recording devices with a storage device and to connect the badge reader with the access controller;
    a power supply configured to supply power to the access controller, the switch, the one or more audio or video recording devices, and the badge reader;
    a housing configured to at least partially enclose the storage device, the access controller, and the power supply; and an access panel coupled to the housing, the access panel configured to at least partially enclose at least one of the storage device, the access controller, or the power supply when coupled to the housing, wherein the storage device, the access controller, the switch, and the power supply are enclosed within the housing of the security kit such that coupling one or more external devices to the security kit initiates access control to the room by the security kit.

11. The security kit of claim 10, further comprising a sensor data storage component configured to receive data from one or more sensors, wherein the one or more sensors detect at least one of heat, smoke, water, or noise.

12. The security kit of claim 11, wherein the sensor data storage component is coupled to the switch and the power supply, wherein the one or more sensors are coupled to the switch and the power supply, and wherein the access controller controls whether the badge reader allows the user access to the room based at least in part on data measured by the one or more sensors.

13. The security kit of claim 10, further comprising a network communication component configured to transmit data to a location remote from the room over a network.

14. The security kit of claim 13, wherein the network communication component is coupled to the switch and the power supply, and wherein the network communication component is further configured to transmit data stored in the storage device to a server over the network.

15. A security kit for securing a room, the security kit comprising:
  an access controller configured to interface with a badge reader associated with one or more access points to the room in order to selectively control access to the room;
  a switch coupled to the access controller, the switch configured to connect one or more audio or video recording devices with a storage device and to connect the badge reader with the access controller;
  a power supply configured to supply power to the access controller, the switch, the one or more audio or video recording devices, and the badge reader;
  a housing configured to at least partially enclose the storage device, the access controller, and the power supply;
  an access panel coupled to the housing, the access panel configured to at least partially enclose at least one of the storage device, the access controller, or the power supply when coupled to the housing; and
  a sensor data storage component configured to receive a sensor value detected by a sensor located outside the room, wherein the access controller is further configured to deny access to the room in response to a determination that the sensor value is greater than a threshold value to protect contents of the room, wherein the storage device, the access controller, the switch, the power supply, and the sensor data storage component are enclosed within the housing of the security kit such that coupling one or more external devices to the security kit initiates access control to the room by the security kit.

16. The security kit of claim 15, wherein the sensor data storage component is coupled to the switch and the power supply, wherein the sensor is coupled to the switch and the power supply, and wherein the access controller controls whether the badge reader allows the user access to the room based at least in part on the sensor value detected by the sensor.

17. The security kit of claim 15, further comprising a network communication component configured to transmit data to a location remote from the room over a network.

18. The security kit of claim 17, wherein the network communication component is coupled to the switch and the power supply, and wherein the network communication component is further configured to transmit data stored in the storage device to a server over the network.

19. The security kit of claim 15, wherein the access controller is further configured to:
  unlock the room in response to a first user requesting access to the room; and
  lock the room in response to a second user requesting access to the room.

20. The security kit of claim 15, wherein the sensor value comprises a smoke detector, and wherein the sensor value comprises a smoke level.

* * * * *